J. E. AUSTIN.
HOSE SUPPORT.
APPLICATION FILED NOV. 2, 1909.
970,164.
Patented Sept. 13, 1910.
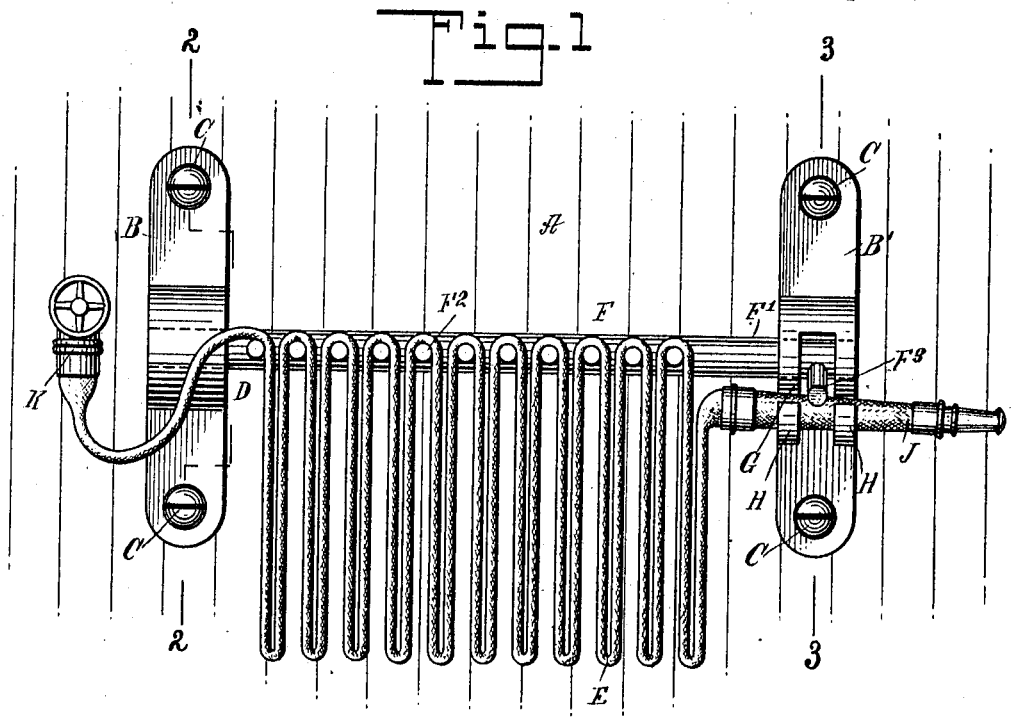
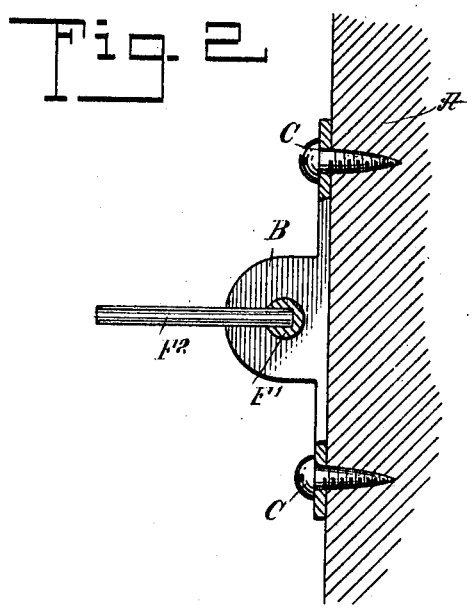
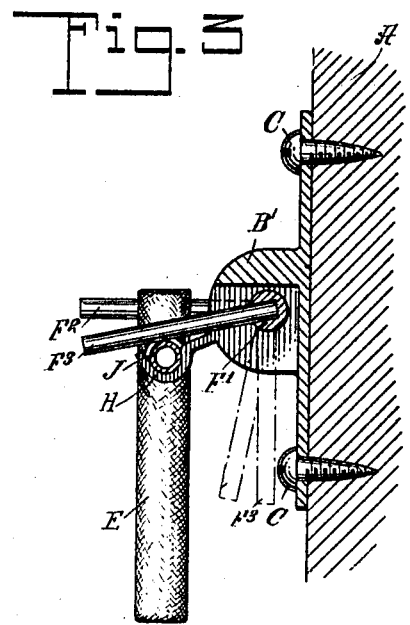
WITNESSES
INVENTOR
James E. Austin
BY
ATTORNEYS

UNITED STATES PATENT OFFICE.

JAMES EDWIN AUSTIN, OF FRESNO, CALIFORNIA.

HOSE-SUPPORT.

970,164. Specification of Letters Patent. Patented Sept. 13, 1910.

Application filed November 2, 1909. Serial No. 525,862.

*To all whom it may concern:*

Be it known that I, JAMES EDWIN AUSTIN, a citizen of the United States, and a resident of Fresno, in the county of Fresno and State of California, have invented a new and Improved Hose-Support, of which the following is a full, clear, and exact description.

The invention relates to hose supports for fire hose and the like, and has for an object to provide a tiltable rack for normally supporting hose, and provided with releasing means for releasing the said rack and permitting the same to tilt, thereby precipitating the hose to the floor or ground.

Among other things my invention embodies a tiltable rack adapted to normally support hose thereon, the said rack being provided with an arm adapted to releasably hold the rack in a normal position.

My invention consists of certain features and combinations of the same, as will be hereinafter more fully described and particularly set forth in the appended claims.

Reference is to be had to the accompanying drawings forming a part of this specification, in which similar characters of reference denote corresponding parts in all the views, and in which, Figure 1 is a front elevation of my invention, secured to the side of a wall by means of suitable bearings; Fig. 2 is a side sectional view of the same, taken on the line 2—2 in Fig. 1; and Fig. 3 is a side sectional view of the same, taken on the line 3—3 in Fig. 1, the final position of the rack when released being shown in dotted lines.

Suitably secured to a wall A, by means of bearings B, B', fastened with screws C, C, is a hose support D having thereon numerous coils of hose E. The hose support D embodies a tiltable rack F, comprising a rack member F' suitably journaled in the bearings B, B' and provided with equally spaced, outwardly-extending pins $F^2$. To one end of the rack member F' an arm $F^3$ is secured, adapted to move vertically in a slot G provided in one of the bearings B. Grooved upwardly-extending lugs H, H, forming holders, are also provided on the bearing B' and adapted to hold a nozzle J secured to one end of the hose E. The other end of the hose E is fastened to a suitable hydrant K mounted on the wall A adjacent the support D.

When the hose support D is in its normal position, supporting a hose E, the rack F is prevented from tilting by the arm $F^3$ in engagement with the nozzle J, resting on the holders H, H and secured to one end of the hose E, the other end of the said hose being fastened to the hydrant K. When it is desired to use the hose, as for instance, for a fire, the nozzle is quickly removed from the holders H, H. This releases the arm $F^3$ which normally holds the rack F, and the weight of the hose on the rack causes the same to tilt and precipitate the hose to the floor. The rack F will then be in the position shown by dotted lines in Fig. 3. To return the tiltable rack to its normal position, the arm $F^3$ is moved upward, the nozzle replaced in the holders H, H, and the arm $F^3$ lowered to engage the nozzle J, as is clearly shown in Fig. 1.

My hose support, as described, is simple, compact and can be operated very quickly. It will be noticed that the action of precipitating the hose to the floor, uncoils the same, thereby saving the operator time and trouble.

It will be understood that although I have shown the nozzle holder integral with one of the bearings, it can also be separately secured to the wall; and it will furthermore be seen that a rod or any strong material of a size similar to that of the nozzle, can be used in engagement with the arm, to hold the rack in its normal position.

Having thus described my invention, I claim as new and desire to secure by Letters Patent:

1. In combination, a hose provided with a nozzle, a tiltable rack for normally supporting the said hose, a holder for the said nozzle, provided with a slot, and an arm on the said rack adapted to operate in the said slot and releasably engaging the said nozzle.

2. In combination, a hose provided with a nozzle at one end and having the other end thereof secured to a hydrant, a tiltable rack for normally supporting the said hose, a holder for the said nozzle, provided with a slot, and an arm on the said rack adapted to operate in the said slot and releasably engaging the said nozzle, the said rack being adapted to tilt when the said nozzle is disengaged from the said arm.

3. In combination, a hose provided with a nozzle at one end and having the other end thereof secured to a hydrant, a tiltable rack for normally supporting the said hose, mounted to tilt between two bearings, one of which constitutes a holder for the said nozzle, and having a slot therein, and an arm on the said rack releasably engaging the said nozzle, the said arm being adapted to operate in the said slot when the said nozzle is disengaged from the said arm.

4. In a hose support, a tiltable rack adapted to normally support a hose provided with a nozzle, a holder for the nozzle and provided with a slot, and an arm on the rack adapted to operate in the slot and releasably engaging the nozzle.

5. In a hose support, a tiltable rack mounted to tilt between two bearings and adapted to normally support a hose provided with a nozzle with one of the said bearings constituting a holder for the nozzle and having a slot therein, and an arm adapted to operate in the said slot when the nozzle is disengaged from the said arm.

In testimony whereof I have signed my name to this specification in the presence of two subscribing witnesses.

JAMES EDWIN AUSTIN.

Witnesses:
   STEPHEN L. WILEY,
   A. B. McWHORTER.